M. R. DEGELOW.
APPARATUS FOR MEASURING TILES.
APPLICATION FILED SEPT. 15, 1910.
1,011,123.
Patented Dec. 5, 1911.
2 SHEETS—SHEET 1.
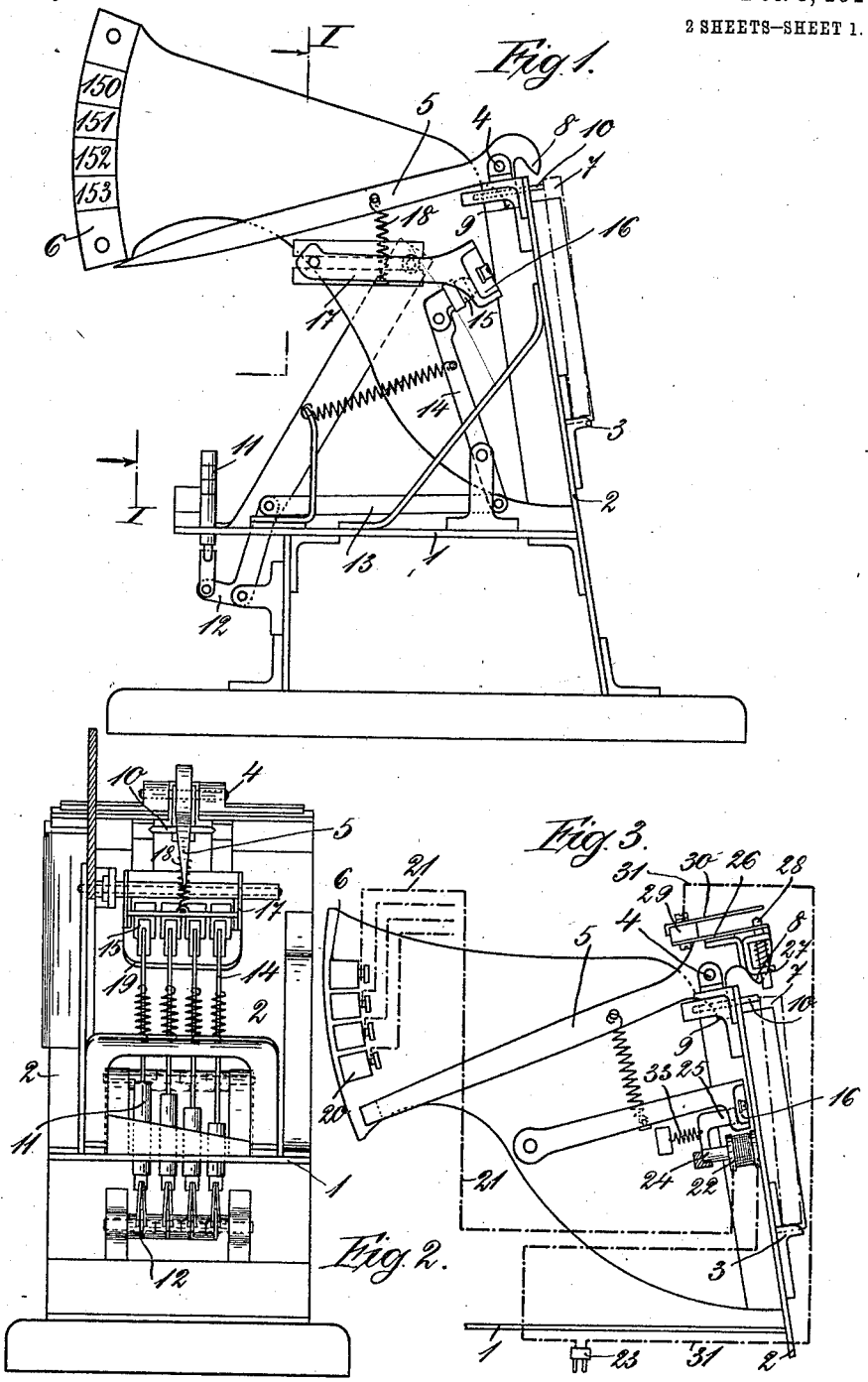

M. R. DEGELOW.
APPARATUS FOR MEASURING TILES.
APPLICATION FILED SEPT. 15, 1910.
1,011,123.
Patented Dec. 5, 1911.
2 SHEETS—SHEET 2.
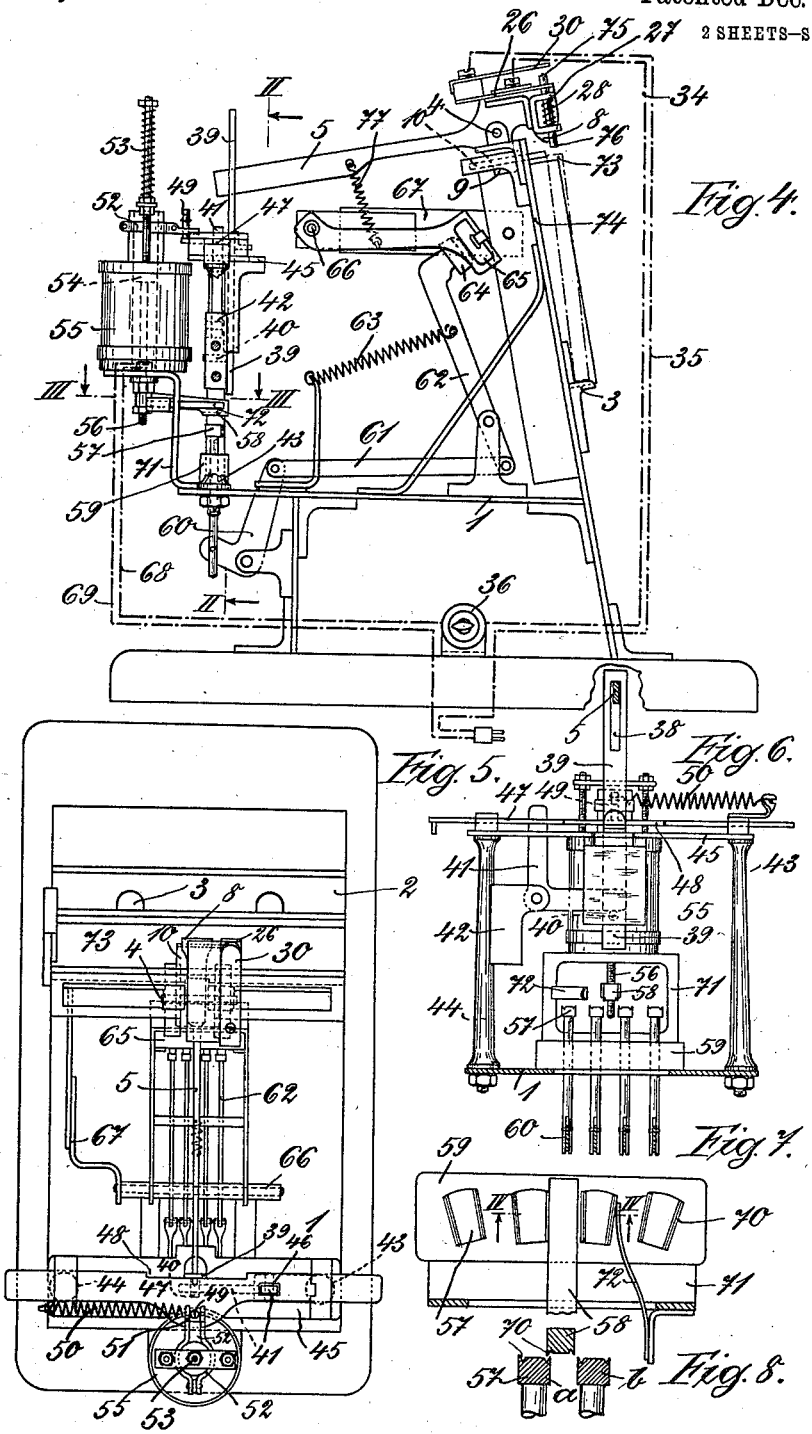

UNITED STATES PATENT OFFICE.

MAX RUDOLF DEGELOW, OF GROHN, NEAR VEGESACK, GERMANY.

APPARATUS FOR MEASURING TILES.

1,011,123. Specification of Letters Patent. Patented Dec. 5, 1911.

Application filed September 15, 1910. Serial No. 582,143.

*To all whom it may concern:*

Be it known that I, MAX RUDOLF DEGELOW, a subject of the King of Prussia, German Emperor, residing at Grohn, near Vegesack, in the Kingdom of Prussia, Germany, have invented certain new and useful Improvements in Apparatus for Measuring Tiles, of which the following is a specification.

The apparatus for measuring tiles is already very well known, that is to say the apparatus in which the tile to be measured is placed in a frame which indicates its dimensions. The tile is then stamped by hand with the size indicated.

In the present invention this apparatus for measuring tiles and similar objects is combined with an arrangement which measures and stamps the tiles at one and the same time.

The object of the invention is represented in the annexed design under three different models.

Figure 1 is a side elevation of the machine. Fig. 2 is a section of the same following the line 1—1 of Fig. 1. Fig. 3 shows a side elevation of another model of the machine. Fig. 4 is a third model. Fig. 5 is a plan of Fig. 4. Fig. 6 is a section of Fig. 4 along the line II—II. Fig. 7 is a section of Fig. 4 along the line III—III. Fig. 8 is a section of Fig. 7 along the line IV—IV.

In each of these different models the machine comprises a frame 1, of which the side 2 carries a support 3 which may consist of two shafts. On the frame 1 there is an indicating lever 5 turning on an axle 4, and by means of which the dimensions of the tile 7 are shown on the scale 6, to this end the short arm 8 of the lever 5 is bent in the form of a hook. The lever is moreover made with a shoulder 9 situated under the axle 4 and running in a grooved sliding piece 10. To measure the tile 7 it is placed on the support 3 and held against the grooved sliding piece 10. The indicating lever is then turned on its axle 4 until the hook 8 strikes against the upper end of the tile to be measured. The pointer of the lever 5 will then indicate the dimensions of the tile on the scale 6. The tile is stamped with its size in the following manner. On the inside of the frame 1 are placed a certain number of keys 11 designed to work, by means of the bent levers 12 and the rods 13, the type levers 14. Being held by springs the types 15 on levers 14 are continually in contact with the inking pads 16. These pads 16 are carried by a lever 17 attached to the indicating lever 5 by a carrier spring 18 so that when the lever 5 is lifted it carries with it the lever of the inking pads and the types 15 are thus disengaged. By pressing the keys 11 which correspond to the figures indicated by the lever 5 the type-carrying lever 14 is made to move and the types 15 strike against the back of the tile 7 through the slit 19. From the above it will be seen that the marking of the tile is not done automatically but depends on the operator working the machine.

In Figs. 3 to 8 the stamping is done automatically. To attain this end an electromagnet is employed (Fig. 3). The plates 20 carrying the figures of the scale 6 are isolated from one another and connected by the wires 21 to the magnet 22, in the circuit of the magnet there has been introduced a source of electricity 23 of any appropriate construction. There is of course a separate magnet for each of the figure-plates 20. The points of the magnets carry each of them a figure 25. The electric wire is connected with the indicating lever 5. When this lever is in its normal position at rest the circuit is broken, but as soon as the lever comes in contact with one or other of the figure-plates 20 a circuit is formed with the corresponding magnet, which, becoming magnetized draws its point 24 and stamps the plate in accordance with the dimensions indicated by the lever 5. In order to prevent the formation of the circuit before the lever 5 comes into contact with the figure-plate 20 indicating the size of the tile, the following precautions have been taken:—Fixed above the pivot of the indicating lever 5 is a plate 26 into which a bolt 28 is driven by the action of a spring placed between the arms of a support 27. Above the plate 26 is a contact section 30 fixed on an insulating block 29 and connected with the conductor 31.

The indicating lever 5 is made of a material which is a good conductor of electricity. As soon as the lever 5 is returned to its position of repose all the other parts of the mechanism return to their initial places, the type-carrying points being withdrawn by means of a spring 33 or in any other appropriate manner.

In Figs. 4 to 8 the arrangement of the contact differs from that of Fig. 3 in as much as the plate 26 and the spring 30 are each of them connected to wires 34, 35. At its other extremity the conductor 34 is connected with a commutator 36. The front end of lever 5 falls into the slot 38 of a vertical rod 39 of which the shoulder 40 presses against one of the arms of a bent lever 41 pivoted in a bracket 42 of the standard 43. The other arm of this bent lever 41 passes through a slot in the horizontal plate 45 fixed on the two standards 43, 44, the upper extremity of the lever being caught in an opening 46 of the movable rod 47 horizontally disposed. In this rod 47 is a slot 48 through which passes the vertical rod 39. The horizontal rod 47 carries a rod 49 against which presses the spring 50 fixed on plate 45. The rod 49 is lodged between the arms of the fork-like extremity 51 of a lever 52 mounted on an axle 53. This axle is fixed on the point 54 of the magnet 55. The axle 53 is fixed to the lever 52 in such a manner that when the lever swings the axle moves with it and displaces the point 54. To the lower arm 56 of the point 54 is fixed the lever 58 which controls the stamp 57. When the rod 47 is displaced by the movement of the indicating lever 5 it causes lever 58 to swing and this last acts directly on the stamp 57. These stamps 57 are placed loose in a guiding piece 59 each of the stamps is attached to a bent lever 60 connected by a bar 61 to a type-carrying lever 62. All these type-carrying levers are submitted to the action of a carrier spring 63. The normal position of the inking pad 65 is in front of the types 64 and it can turn around the shaft 66 set in arm 67 which is fixed to the frame 1. The magnet 55 is connected with conductors 68, 69 one of which terminates in the commutator 36.

In order to prevent the striking of a stamp which does not correspond to the plate giving the size of the tile the lever 58 is provided (Fig. 8) with conical notches along its edges. The movable stamps 57 in the guiding piece 59 are also furnished with notches similar to those of the lever 58. The distance between the stamps 57 is slightly less than the width of the lever 58, the difference being however only a fraction of a millimeter. This arrangement insures the striking of the proper stamp. Let us suppose that the stamp lever, whose movement around the bolt 56 is regulated by the amplitude of the rise in the indicating lever 5, is a trifle nearer the stamp (a) than the stamp (b) (Fig. 8) it will then be brought toward the stamp (a) by the conical notches 70. With this arrangement it is absolutely impossible for two stamps to be struck simultaneously. A spring 72 has also been fixed on the body 71 of the magnet (Fig. 7), in order to facilitate the return of lever 58 to its initial position.

The working of the apparatus is as follows:—The tile 73 to be measured, which is represented by the dotted line in Fig. 1, is placed on the support 3. The grooved sliding piece 10 is then pushed along by pressing against the tile the side 74 of the frame 1. This puts the lever 5 in motion and its point rises until the hook 8 rests upon the upper edge of the tile 73. The swinging movement of lever 5 causes the bolt 28 to swing likewise and that in spite of the contrary action of its spring. This bolt 28 is thus brought into contact with the blade 30. The distance between the upper edge 75 of the bolt 28 and the blade 30 is equal to the distance between the lower edge of the hook 8 and the lower edge 76 of the bolt 28. As soon as lever 5 begins to swing, the spring 77 withdraws the inking pad 65 from the types 64 which are thus liberated. The indicating lever 5 carries with it the rod 39 whose vertical movement is transformed by the transmitting mechanism into a swinging movement of lever 52 and through it to the stamp lever 58. This lever 58 is thus brought above the stamp 57 corresponding to the dimensions of the tile to be measured. As soon as the lower edge of the hook 8 of lever 5 comes in contact with the upper edge of the tile 73, the bolt 28 touches the blade 30. As a result the electric circuit is completed and the magnet 55 electrified so that it attracts its point 54 which at once acts upon the stamp.

I claim:

1. An apparatus for measuring tiles and for printing the measures on the tile comprising in combination with the supporting frame for the tile, a graduated scale, an indicating lever pivotally mounted in said frame so that its front end can freely move over said graduated scale, a hook shaped rear end of said lever to be brought in contact with the upper edge of the tile, type levers pivotally mounted on the frame so that the types are behind the tile to be stamped, means for normally holding said type levers in the inoperative position, means for operating said type levers when the measuring lever is operated, and means for releasing said holding means, substantially as described and shown and for the purpose set forth.

2. An apparatus for measuring tiles and for printing the measures on the tile comprising in combination with the supporting frame for the tile, a graduated scale, an indicating lever pivotally mounted in said frame so that its front end can freely move over said graduated scale, a hook shaped rear end of said lever to be brought in contact with the upper edge of the tile, type levers pivotally mounted on the frame so that the types are behind the tile to be stamped, an inking pad normally situated in front of and in contact with the type levers, a lever pivotally mounted in the frame of the machine and carrying in its free end said inking pad, a spiral spring connecting said lever with the indicating lever, and means for operating the type lever corresponding to the size of the tile, substantially as described and shown and for the purpose set forth.

3. An apparatus for measuring tiles and for printing the measures on the tile comprising in combination with the supporting frame for the tile a graduated scale, an indicating lever pivotally mounted in said frame so that its front end can freely move over said graduated scale, a hook shaped rear end of said lever to be brought in contact with the upper edge of the tile, type levers pivotally mounted on the frame so that the types are behind the tile to be stamped, means for normally holding said type levers in the inoperative position, means for operating said type levers when the measuring lever is operated, and typewriter keys arranged in the frame of the machine and having numbers and indications corresponding with those on the graduated scale and on the type levers, and means for transmitting the motion of the keys to said type levers.

In witness whereof I have hereunto set my hand in the presence of two witnesses.

MAX RUDOLF DEGELOW.

Witnesses:
 HANS MEISSNER,
 JULIUS BEYER.

Copies of this patent may be obtained for five cents each, by addressing the " Commissioner of Patents, Washington, D. C."